United States Patent [19]

Gunji

[11] Patent Number: 5,487,154
[45] Date of Patent: Jan. 23, 1996

[54] HOST SELECTIVELY DETERMINES WHETHER A TASK SHOULD BE PERFORMED BY DIGITAL SIGNAL PROCESSOR OR DMA CONTROLLER ACCORDING TO PROCESSING TIME AND I/O DATA PERIOD

[75] Inventor: Keita Gunji, Tokyo, Japan

[73] Assignee: Hewlett-Packard Co., Palo Alto, Calif.

[21] Appl. No.: 913,608

[22] Filed: Jul. 14, 1992

[30] Foreign Application Priority Data

Jul. 18, 1991 [JP] Japan ................................. 3-204008

[51] Int. Cl.$^6$ ........................... G06F 13/12; G06F 13/14
[52] U.S. Cl. ..................... 395/842; 395/650; 364/242.3; 364/242.31; 364/260; 364/DIG. 1; 364/264.5; 364/270.6
[58] Field of Search .................................. 395/250, 275, 395/425, 650, 700, 800; 364/200

[56] References Cited

U.S. PATENT DOCUMENTS

| | | | |
|---|---|---|---|
| 4,262,331 | 4/1981 | Freeland et al. | 364/200 |
| 4,392,196 | 7/1983 | Glenn et al. | 364/200 |
| 4,517,641 | 5/1985 | Pinheiro | 364/200 |
| 4,658,351 | 4/1987 | Teng | 395/650 |
| 4,954,945 | 9/1990 | Inoue | 364/200 |
| 5,045,993 | 9/1991 | Murakami et al. | 364/200 |
| 5,291,614 | 3/1994 | Baker et al. | 395/800 |

OTHER PUBLICATIONS

Jun Kurita, et al., "An Advanced Test System Architecture for Synchronous and Asynchronous Control of Mixed Signal Device Testing", 1990 International Test Conference, 1990 IEEE, pp. 508–513.

Koji Karube, et al., "Advanced Mixed Signal Testing by DSP Localized Tester," 1991 International Test Conference, 1991 IEEE, pp. 1055–1060.

*Technical Summary* "96–Bit General–Purpose Floating–Point Digital–Signal Processor (DSP)," Motorola Inc., 1988.

*Primary Examiner*—Thomas C. Lee
*Assistant Examiner*—Le Hien Luu

[57] ABSTRACT

A low-cost digital signal processing system is provided which can prevent data loss during data transfer and can eliminate processing overhead regardless of the length of the I/O period of an external I/O processing device. When the data I/O period of the external I/O device such as an A/D converter is shorter than the period of data processing by the DSP, the data reception and transmission are performed through a DMA controller between the external I/O devices and the memory to reduce the burden on the DSP. On the other hand, when the data input and output period is longer than the DSP processing time, the data reception and transmission is directly carried out by the external I/O device and the DSP without use of the DMA controller. In addition, in the execution of a DSP program which comprises at least one process, a function of each process is provided to have input and output parameters identifying the addresses of data reception or transmission units which are assigned to the input and output parameters to simplify the DSP programming.

5 Claims, 6 Drawing Sheets

PRIOR ART

Fig. 1

PRIOR ART

Fig. 2

PRIOR ART

HOST SELECTIVELY DETERMINES WHETHER A TASK SHOULD BE PERFORMED BY DIGITAL SIGNAL PROCESSOR OR DMA CONTROLLER ACCORDING TO PROCESSING TIME AND I/O DATA PERIOD

FIELD OF THE INVENTION

This invention relates to an I/O technique for a digital signal processing system, and more particularly, to a technique for substantially eliminating data loss during data access to/from an external I/O device without additional processing overhead.

BACKGROUND OF THE INVENTION

A test system for examining the characteristics of an Integrated Services Digital Networks (ISDN), an A/D converter and the like performs digital calculations such as Fourier transformation, Fourier inverse-transformation and other filtering functions. In order to increase the processing speed, a digital signal processor, hereinafter referred to as "DSP", has been used.

Figure 1:
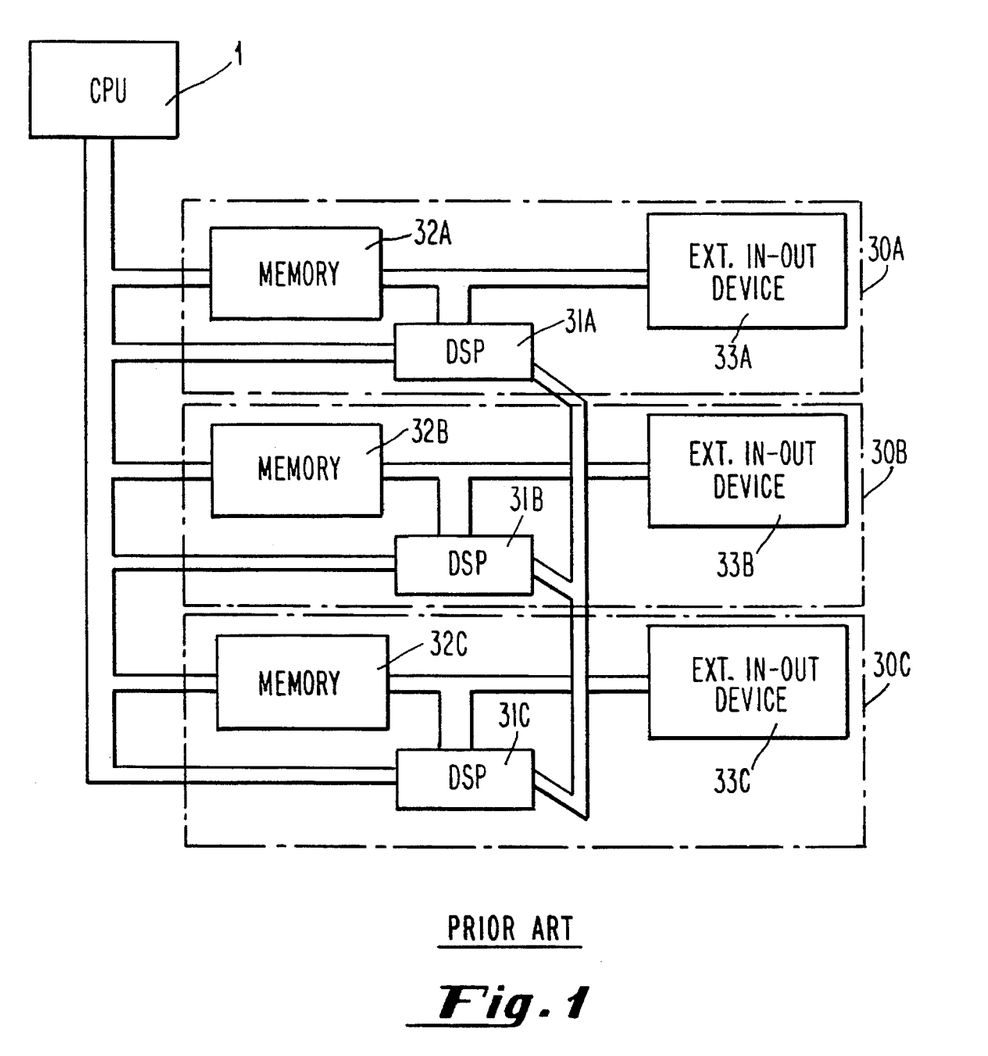
FIG. 1 shows a conventional multi-processor type digital signal processing system.

FIG. 1 schematically illustrates an embodiment of a multi-processor type signal processing system which comprises three DSP units 30A, 30B, 30C and a CPU 1 for controlling these units. The units 30A, 30B, and 30C are respectively equipped with DSPs 31A, 31B, and 31C, memories 32A, 32B, and 32C and external I/O devices 33A, 33B and 33C. During operation, in the unit 30A, for example, I/O data is accessed from the I/O device 33A and is then sent to the DSP 31A and subjected to processing such as Fourier transformation. The processed data is then transferred to the unit 30B through a peripheral I/O interface (not shown) and subjected to further processing such as filtering in the DSP 31B. The processed data is then transferred to the unit 30C through a peripheral I/O interface (also not shown). The processed data is then subjected to a further processing such as Fourier inverse-transformation by the DSP 31C, and the processed result is transferred to external I/O device 33C for output.

In addition to executing a high-speed processing program, the DSP generally has other functions for executing various processes. These tasks include access to the external I/O devices for receiving data from various output devices such as an A/D converter, a D/A converter, various types of peripheral I/O interfaces, etc., and for transferring the computed data to other external I/O devices. The following methods have been known for transferring data during reception and transmission to/from external I/O devices: (1) the data receiving and transmitting operations are carried out through an interrupt to the computer program of the DSP; and (2) with no interrupt, the data is temporarily stored in an external register file and then the data reception and transmission are successively carried out.

Figure 2:
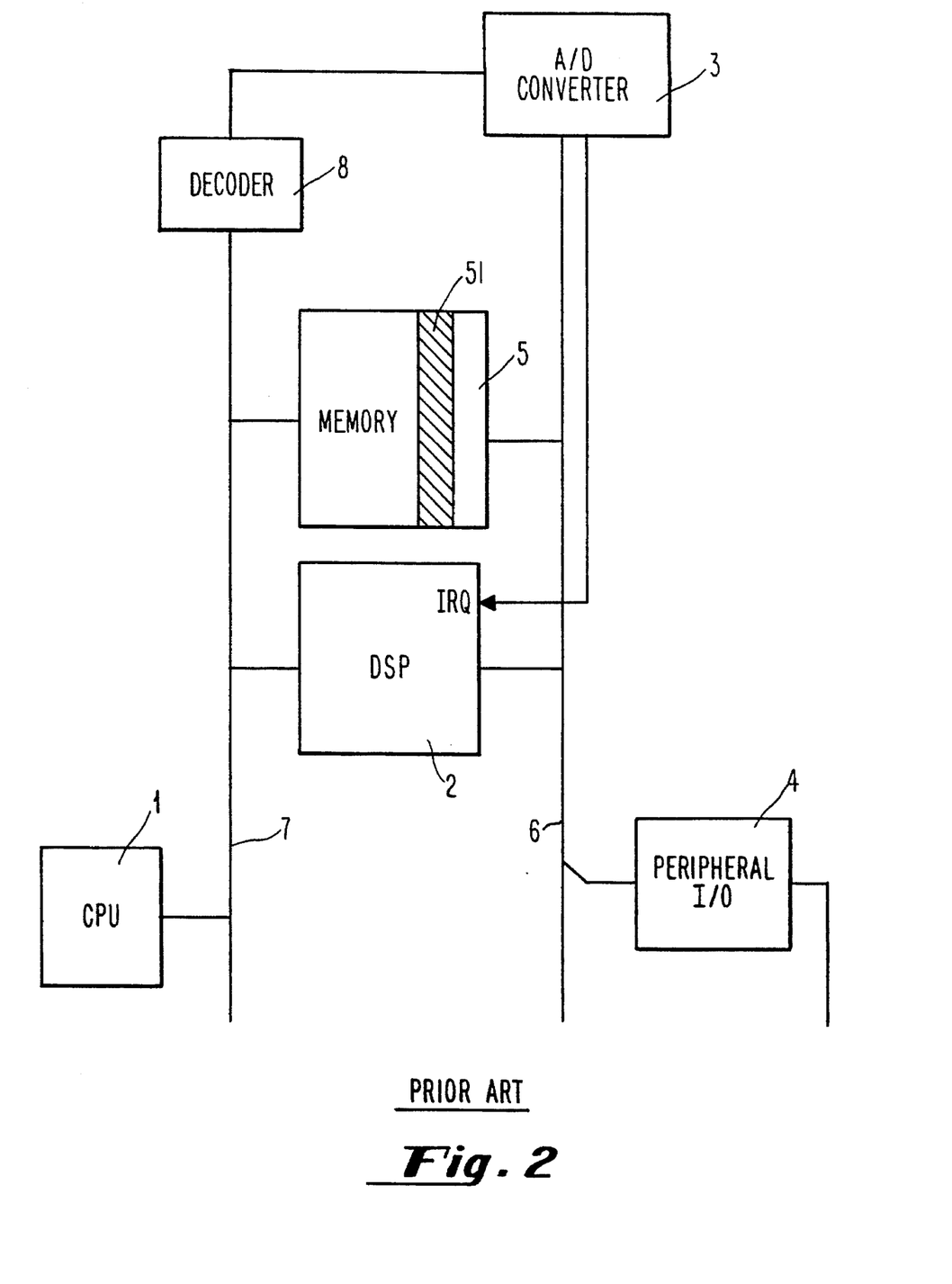
FIG. 2 shows a conventional digital signal processing system using interrupts.

FIG. 2 is a schematic circuit diagram of an embodiment of a conventional digital signal processing system utilizing the method (1). In FIG. 2, a DSP 2 controls an access to a memory 5, an A/D converter 3, and a peripheral I/O interface 4 through common busses such as data bus 6 and address bus 7. A decoder 8 is further provided in the address bus 7 to output an enable signal to the A/D converter 3 and the peripheral I/O interface 4. In addition, through the common system bus, the CPU 1 performs various processing including controlling the DSP 2, loading down the DSP program to the memory 5, and so on.

The DSP 2 runs a DSP program in the memory 5 which serves as a real-time monitor. Instructions for the DSP 2 are programmed in the real-time monitor in such a manner that a series of signal processing blocks are constructed as a processing task. These programs are executed under the management of a scheduler. However, the I/O processing is carried out as a different task from the above task. The I/O processing is commenced by an interrupt through a data enable signal of the A/D converter 3 and serves to temporarily transfer input data from the A/D converter 3 to a buffer 51 indicated as an area in the memory 5 in FIG. 2. A semaphore serving as a real-time monitor also may be set up in the buffer 51. Then, when data to be processed exists in the buffer 51, the DSP 2 synchronizes with the data based upon the semaphore value and transfers the data to a signal processing task which is waiting for the data.

However, since this method requires interrupt processing for receiving input data from A/D converter 3, it usually increases the processor load in the DSP 2. For example, the data receiving operation of the DSP 2 from the A/D converter 3 is executed through an interrupt and makes it impossible for the DSP 2 to carry out other processing such as high-speed computing operations during the execution of the above processing. The processing capability of the DSP 2 is thereby greatly restricted.

In addition, if it takes longer for the DSP 2 to process I/O data than the I/O period of the I/O device, some data may be left behind after the processing. Accordingly, the data I/O period of the I/O device is restricted by the DSP 2 processing speed. For example, the sampling rate of the A/D converter 3 such as shown in FIG. 2 or a generation rate of the D/A converter is restricted by the processing speed of the DSP 2. Therefore, this method has a disadvantage that the I/O device speed cannot be increased beyond the speed of the DSP 2.

Figure 3:
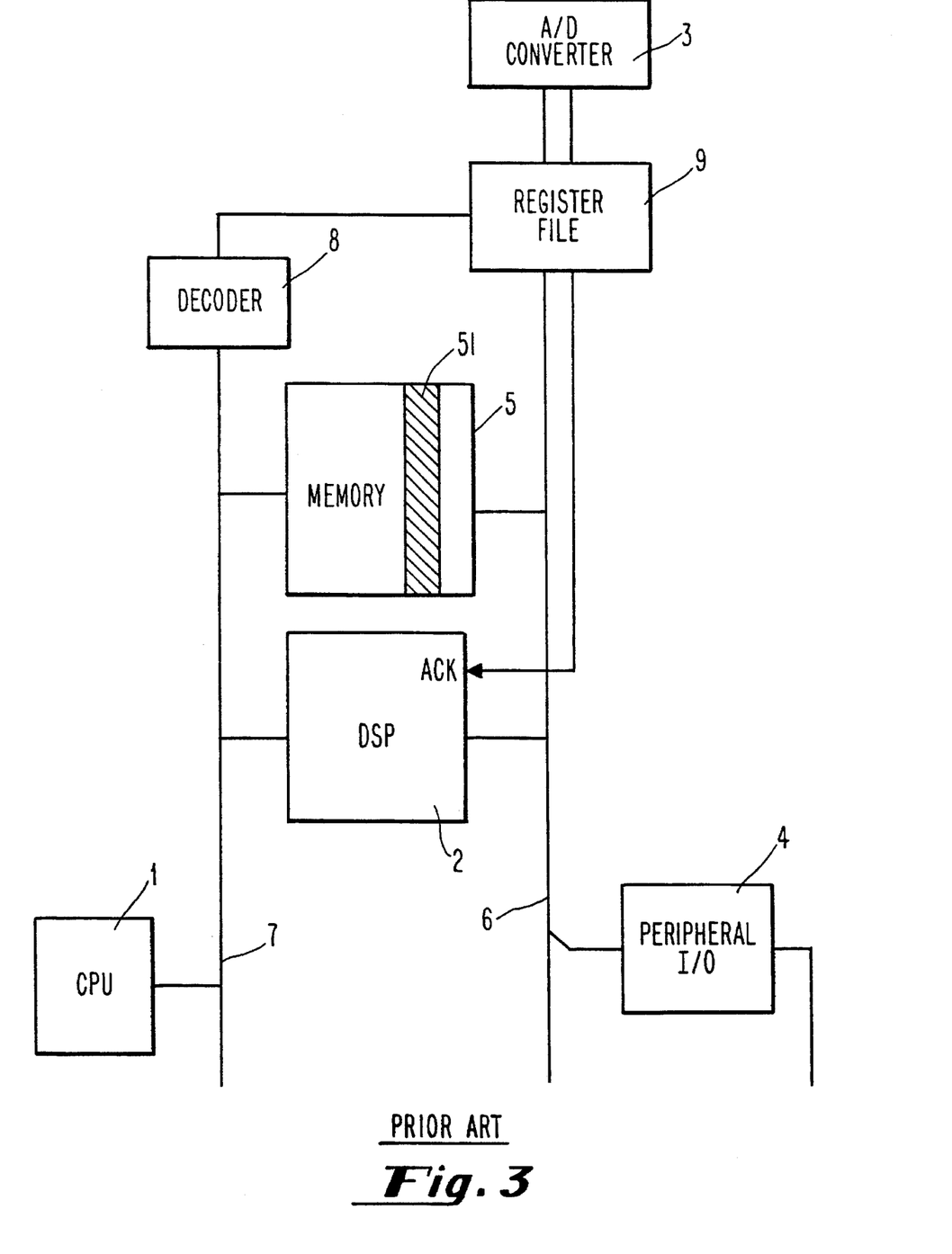
FIG. 3 shows a conventional digital signal processing system using an external register file.

In view of the above restriction, when implementing the method (2) using a circuit as shown in FIG. 3, the I/O processing is not carried out as a different task but is carried out with an instruction contained in a signal processing task. According to this method, an external register file 9 is provided between the A/D converter 3 and the DSP 2 and performs the synchronization of the data without a real-time monitor. That is, this method does not use an interrupt to communicate with the monitor program. Instead, the register file 9 performs an I/O data operation in response to a read/write command in a task for a series of signal processing tasks until it reaches the I/O limitation of the register file 9. Such an I/O limitation includes the operation period of the I/O device.

In actual operation, the DSP 2 checks the contents of the register file 9 to ascertain whether data exists in the register file 9. If there is no data in the register file 9, the DSP 2 is placed in a waiting state so that it is not required to carry out another process such as checking the content of the semaphore in accordance with method (1). Since the DSP 2 accesses the I/O devices through the register file 9, the DSP 2 requires no interrupt processing. Thus, the burden imposed on the DSP 2 in association with the data I/O processing can be alleviated.

However, this method has a disadvantage that during this waiting state, the DSP 2 still cannot carry out any other processing, which results in processing overhead. Thus, the total processing efficiency of the system is reduced due to processing overhead. This method has a further disadvantage that the register file 9 is comprised of expensive hardware which increases the total cost of the system.

Moreover, many register files are sometimes required for one system so that this method results in a large increase in the total manufacturing cost for the system. Further, when the data input and output period exceeds the processing period of the DSP 2, the input data to the register file 9 is overflowed, and thus, some data may be lost.

SUMMARY OF THE INVENTION

This invention has been made to overcome the above disadvantages of the prior art. It is an object of the current invention to access data without data loss even when the I/O period in the external I/O device is shorter than the data processing period of the DSP. It is another object of the invention to successively process the data so as to prevent processing overhead when the I/O period is longer than the DSP processing period. It is yet another object of the current invention to provide a control method for a digital signal processing system capable of realizing the above operations at a lower cost than comparable prior art devices.

According to the current invention, when the I/O period of an external I/O device is shorter than the DSP processing period, the data reception and transmission to and from external I/O devices such as an A/D converter, a D/A converter and so on are performed through a DMA controller between a memory and the external I/O devices. In one embodiment, the DMA controller is used to perform the data processing which is to be originally performed by the DSP such that the data I/O processing is carried out independently of the calculations by the DSP whereby the burden of the DSP is alleviated. In addition, since the I/O data can be subject to processing at the maximal transfer rate of the DMA controller, this invention is applicable to a high-speed I/O device. In other cases, the data reception and transmission to and from the external I/O devices are directly carried out between the DSP and the external I/O devices without the DMA controller.

In accordance with the invention, a host CPU calculates the period required for the processing by the DSP. The CPU then compares this period with the I/O period of the external I/O device and determines whether the data reception and transmission to and from the external I/O devices is to be carried out through the DMA controller or to be directly carried out by the DSP.

In accordance with the invention, in place of a register file, an inexpensive DMA controller is used which is about 1/10 of the cost of the register file. Thus, the total manufacturing cost of the system is greatly decreased.

The DSP of the invention may also execute a data empty check program using a semaphore to determine the existence of I/O data in an input buffer of the DSP. This program prevents the DSP itself from falling into a waiting state for the I/O data. Thus, during the data empty state, the DSP can carry out other processing without waiting.

The invention is further characterized by the execution of a DSP program which comprises at least one process having I/O parameters and a data reception and transmission addresses which are provided to the I/O parameters during the execution of each process. That is, in each process an address for an external I/O device such as a memory, a latch and the like is provided through the I/O parameters by merely invoking the processing function for the process. It is thus unnecessary to write instructions for accessing hardware such as the memory and the external I/O devices for each access. Customized programming for different kinds of external I/O devices is also eliminated by merely providing appropriate I/O addresses to the DSP processes via the I/O parameters. In addition, a signal processing program for one system is easily transported to another system so as to more effectively use a software resource.

DETAILED DESCRIPTION OF THE PREFERRED EMBODIMENT

Figure 4:
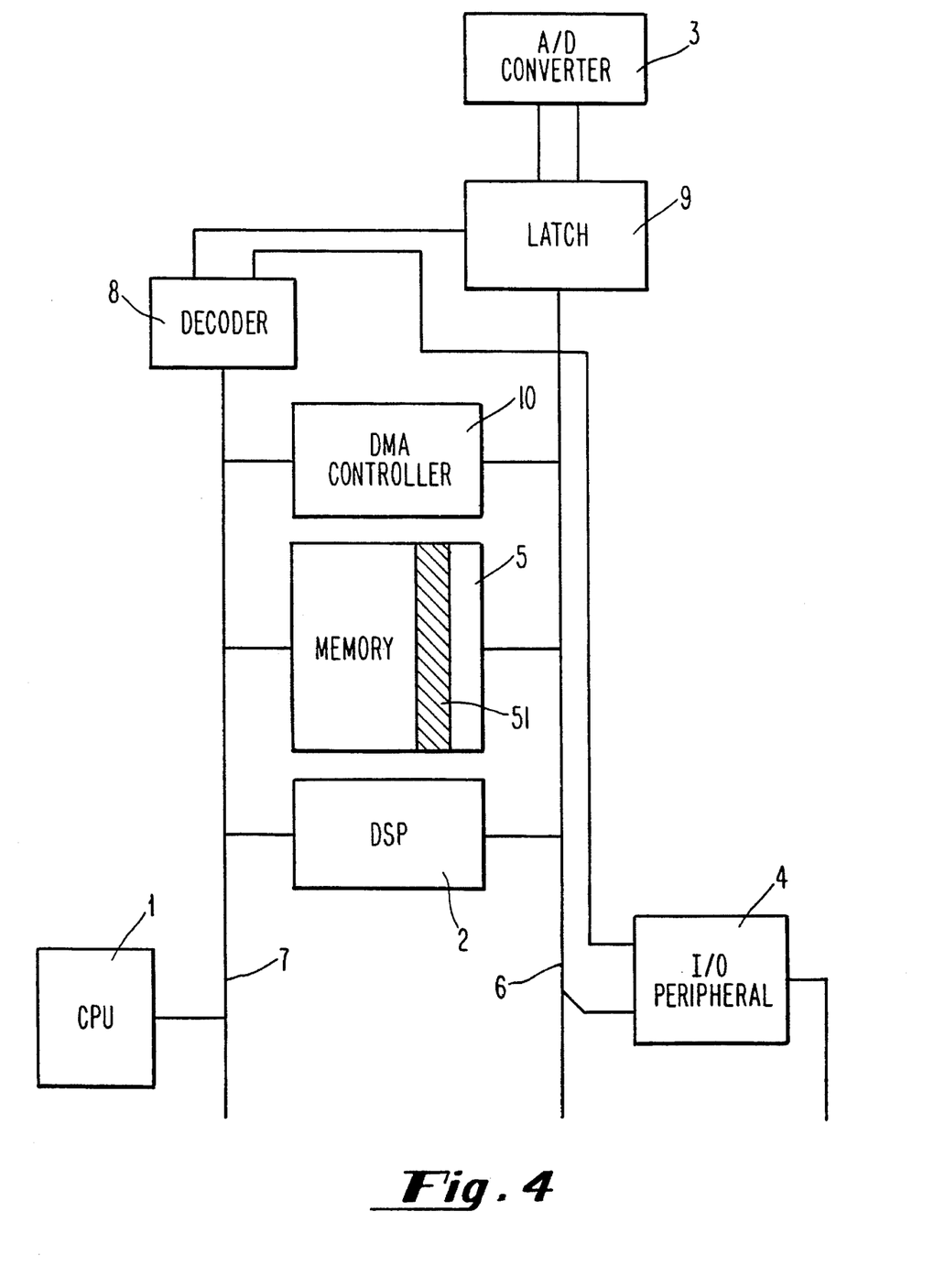
FIG. 4 shows an embodiment of a digital signal processing system in accordance with the invention in which the control method of the invention is implemented.
Figure 5:
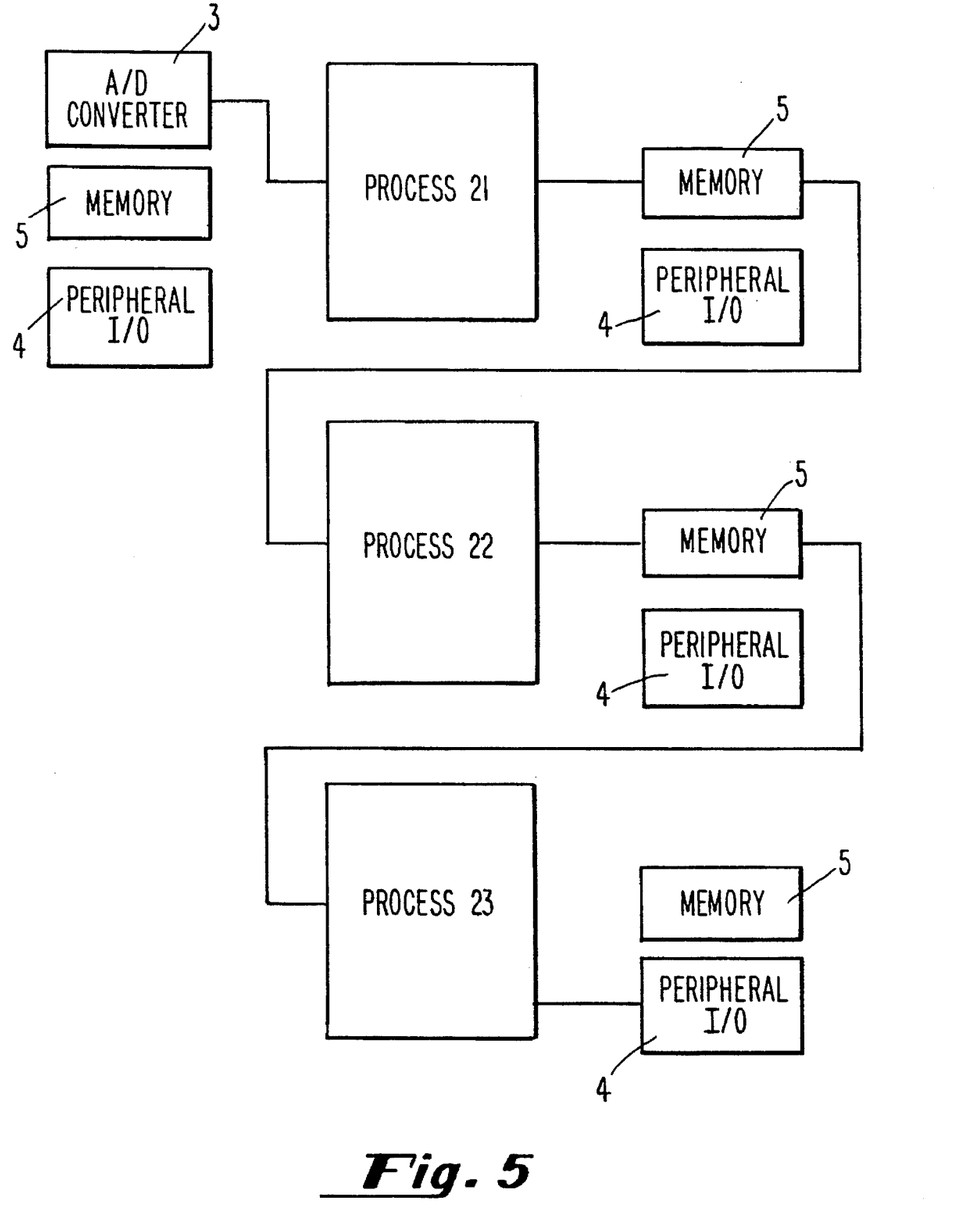
FIG. 5 is a block flow diagram showing an embodiment of the control method for use in the digital signal processing system as shown in FIG. 4.
Figure 6:
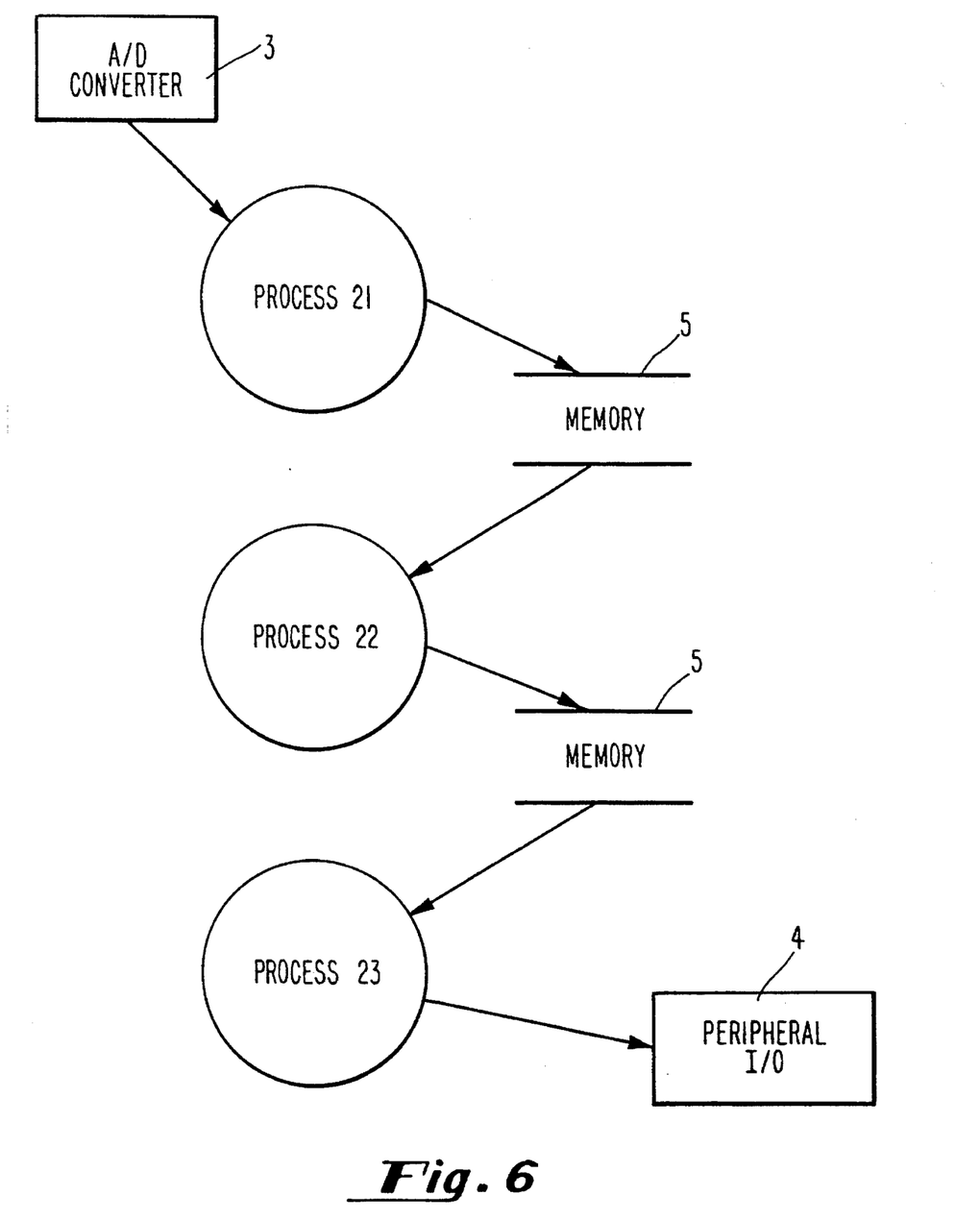
FIG. 6 is a data flow diagram showing an embodiment of the control method for use in the digital signal processing system as shown in FIG. 4.

FIG. 4 shows an embodiment of a control system for a digital signal processing system according to the invention. In FIG. 4, the CPU 1 and the whole system including the DSP 2 (such as the DSP 96002 produced by Motorola Company), the external I/O devices (such as A/D converter 3 and peripheral I/O interface 4), and the memory 5 with a real-time monitor are connected to one another through the common buses including data bus 6 and address bus 7. A decoder 8 for outputting a control signal to the A/D converter 3 is provided on the address bus 7. In addition, a latch 9 is provided in place of the register file as shown in FIG. 3. A direct memory access (DMA) controller 10 is also provided between the data bus 6 and the address bus 7. For the purpose of simplicity, the signal processing system of FIG. 4 illustrates only one of the DSP units as shown in FIG. 1, and other units are omitted from the figure. As shown in FIGS. 5 and 6, plural signal processing blocks are preferably in the memory 5 so that these blocks constitute a single processing task.

According to the invention, the digital signal processing system is constructed as illustrated in FIG. 4. However, in accordance with the invention, either the DMA controller 10 or the DSP 2 are accessed by the A/D converter 3 during data transfer based on the comparison between the I/O period ($T_{io}$) of the A/D converter 3 and the executing time of a series of signal processing blocks of the DSP 2, that is, a signal processing period ($T_{cal}$) of the DSP 2. When $T_{io} < T_{cal}$, the I/O period $T_{io}$ of the A/D converter 3 is shorter than the signal processing period $T_{cal}$ of the DSP 2. Hence, if the signal processing block required direct data access to the A/D converter 3, some data would be lost. Accordingly, in this case, the DMA controller 10 is used and the data I/O operation is independently performed from the processing by the series of signal processing blocks. This state will be hereinafter referred to as the "first mode." The maximum value of $T_{io}$ is approximately about 1 million words/second in a preferred embodiment. For example, when $T_{io}$ is equal to 800,000 words/second, a relationship of $1/T_{io} > 1/T_{cal}$ can be satisfied (although dependent on the value of $T_{cal}$). Within a permissible depth of the memory buffer 51 where the I/O data is stored, the DMA controller 10 performs the I/O operation independent of DSP 2.

As described above with respect to FIG. 2, when the DSP 2 receives the I/O data from the A/D converter 3, the data receiving operation of the DSP 2 is not typically carried out as an independent task. Instead, the operation is carried out through the buffer 51 under the control of a real-time monitor. Further, a semaphore is provided in the buffer 51 to which the input data is stored, and the DSP 2 transfers the data to the signal processing task while it executes an empty check job to determine whether the input data is stored in the buffer 51 or not.

On the other hand, when $T_{io} \geq T_{cal}$, the signal processing period $T_{cal}$ of the DSP 2 is shorter than or equal to the input period $T_{io}$ of the A/D converter 3. Hence, if the signal processing block requires the direct I/O data access with the A/D converter 3, no data is lost. This signal processing block is thus commenced through an interrupt processing by a scheduler or a data ready signal from the A/D converter 3. Thus, the processing is carried out without the DMA controller 10. This state will be referred to as the "second mode."

However, as described below, $T_{cal}$ is calculated on the basis of the time obtained for a series of processing blocks and an error may be made in the calculation when $T_{io} \approx T_{cal}$. Thus, in order to ensure the reliability of the processing operation, even if the signal processing period of the DSP is shorter than the sampling period of the A/D converter 3, the access to the A/D converter 3 is carried out through the DMA controller 10 in the same manner as described above. Hence in this case, the processing mode of the DSP 2 is set to the first mode as described above. The signal processing task is then controlled so as to be brought into the waiting state for transmission of the input data into the buffer 51 even if there are no data in the buffer 51. The calculation of the periods $T_{io}$ and $T_{cal}$ and the comparison thereof will be described in more detail below.

While $T_{io}$ is determined by a host controller such as CPU 1 at the time when the hardware such as A/D converter 3 for receiving the I/O data is controlled, $T_{cal}$ is calculated by combining the processing times of each block required for processing the data. Then, $T_{io}$ is compared with $T_{cal}$ by the host CPU 1. The first or second mode as described above is then selected prior to the execution of the signal processing program.

Just prior to interrupting DSP 2, the peripheral I/O interface 4 outputs a data ready or data empty signal for every transmission of data. Thereafter, these signals are supplied to the interrupt processing program to keep the peripheral I/O interface 4 in synchronism with the signal processing task which accesses the data in the peripheral I/O interface 4.

The program of the signal processing task of the DSP 2 will be now be described. At first, just like supplying an address to the memory 5, addresses are assigned to the external devices such as the A/D converter 3, the peripheral I/O interface 4 and the like. These addresses are delivered to an I/O processing block. In this manner, each external I/O device is accessed like a function.

Actually, as shown in the block flow diagram of FIG. 5 and the data flow diagram of FIG. 6, a series of predetermined signal processing functions in the DSP 2 are preset so as to access all the I/O data with a pointer in front of and behind the body of the functions. For instance, as preprocessing for each of processes 21 through 23, or as processing prior to the execution of the first process 21, a function with common I/O is executed to associate an input and output address of each process respectively with common parameters "input" and "output." Therefore, using these "input" and "output" parameters as pointers, the signal processing function can be expressed as:

func $X$ (input, output)

($X$=1,2,3).

The above "input" and "output" parameters can be treated in the same way as a memory.

In a case where an object to be accessed is an I/O device (for example, A/D converter for the data reception of the process 21), during preprocessing either the first mode involving processing through the DMA controller 10 or the second mode involving processing through the DSP 2 itself is selected for accessing the A/D converter 3 based upon a comparison between $T_{io}$ and $T_{cal}$. Thereafter, the address of a latch 9 is given to the "input" pointer and "func 1" is commenced simultaneously with the reception of the data. Next, when an object to be accessed is the memory 5, after the calculation in process 21 the address of the memory 5 is given to the "output" pointer. Then the separation of the DMA controller 10 of FIG. 4 is carried out as postprocessing.

When the memory 5 is to receive the data as in the case of process 22, the wait processing is carried out using the semaphore. The address thereof is given to the "input" pointer. In the same manner as the process 211 "func 2" is commenced simultaneously with the data reception to deliver the address of the data transmission side to the "output" pointer. "Func 2" transmits the data to the memory 5 after the processing by process 22.

Further, when the memory 5 is the data transmission side as in process 23, in the same manner as the process 22, the wait processing is carried out by using the semaphore to deliver the address to the "input" pointer and "func 3" commences. However, in this case, the peripheral I/O interface 4 is the data transmission side. Thus, during preprocessing, the peripheral I/O interface 4 is set as an object to be accessed, and the I/O connection is released during postprocessing.

The processes 21 through 23 perform as described above. When a function is actually executed in these processes, the external devices to be accessed such as the A/D converter 3, the memory 5, the peripheral I/O interface 4 and the like are specified with the address either as input or output. Therefore, the signal processing can be performed by the function without consideration of the additional input and output processing by specification of the external devices and addresses.

The invention described herein has the following advantages.

(1) Since the data transmission is processed either by the DMA controller or the DSP based upon a comparison of the I/O period of the external I/O device with the processing period of the signal processing by the DSP, it is possible to realize a control method suitable for all signals of any periods. In addition, since no external register file is used, the manufacturing cost of the system is reduced.

(2) If the data I/O period of the external I/O device such as the A/D converter, the D/A converter and the like is shorter than the processing period of the DSP, the data reception and transmission are performed through the DMA controller so that the input and output operations can be completely finished without a data loss even with a high-speed external I/O device. Thus, the data processing is carried out without reducing the sampling rate of the A/D converter, the generation rate of the D/A converter, and the like.

(3) When the I/O period of the external I/O device is longer than the processing period of the signal processing task of the DSP, processing overhead can be reduced. The time saved by reducing the overhead can be used for other processing. Thus, more complicated processing which otherwise would not be executed in the conventional method may be performed.

(4) In the data transmission using the DMA controller, if the I/O period of the external I/O device is substantially longer than the processing period of the signal processing task by the DSP, no waiting is required at the data input time. Unfortunately, in order to precisely measure these periods complicated hardware has been required. However, according to this invention, the same principle as used in the case where the I/O period is shorter than the processing period by DSP is applicable to this case. Thus, the wait processing using the semaphore is also performed. Therefore, complicated hardware and software for performing the above measurement is not necessary.

(5) Since the addresses of the external I/O devices such as the A/D or D/A converters, the peripheral I/O interface and the like are associated with the I/O parameters in advance and these I/O parameters are served as the pointers to access the external devices, the data transfer between the processes can be made in common. Consequently, when programming in a language such as assembler, the specification of the external devices and the addresses thereof are not required. Accordingly, the signal processing program can be improved without relying on the hardware. The program thus may be commonly used to reduce the development cost.

What is claimed is:

1. A signal processing apparatus comprising:

memory means for storing digital signals and processes for processing said digital signals;

input and output (I/O) means for inputting and outputting said digital signals to and from said signal processing apparatus;

a direct memory access (DMA) controller connected to said memory means and said I/O means for storing/reading said digital signals to/from said memory means and said I/O means in a direct memory access mode;

a digital signal processor (DSP) connected to said DMA controller, said I/O means, and said memory means for processing said digital signals stored in said memory means, said DSP executing a data empty check program under the control of a real-time monitor including a semaphore for checking for the existence of said digital signals to be processed and executing another process when said digital signals are not available for processing; and a host CPU connected to said DMA and said DSP for determining whether a data transfer requested by a task of said processes is performed by said DMA controller or said DSP based upon a comparison between an I/O data period and a processing time of said task, whereby said data transfer requested by said task is performed by said DMA when said I/O period is shorter than said processing time of said task.

2. Apparatus according to claim 1 wherein said DSP uses an interrupt for initiating data transfer with said I/O means when said processing time of said task is shorter than said I/O period.

3. Apparatus according to claim 1 wherein address of said I/O means are passed between said processes as input and output parameters in a process function call.

4. A method of processing digital signals in a signal processing apparatus comprising an input and output (I/O) means, memory means for storing said digital signals and a plurality of processes which operate on said digital signals, a direct memory access (DMA) controller, and a digital signal processor (DSP) for processing said digital signals stored in said memory means for digital signals received directly from said I/O means in accordance with a data transfer request from said plurality of processes, said method comprising the steps of:

a) executing a data empty check program on said DSP using a real-time monitor including a semaphore for checking for the existence of said digital signals to be processed and executing another process when said digital signals are not available for processing;

b) determining a processing period of a task processing said digital signals;

c) determining an I/O period;

d) comparing said processing period to said I/O period;

e) invoking said DMA controller for transferring said digital signals to/from said memory means based upon said comparison in step c) when said processing period is longer than said I/O period;

f) interrupting said DSP currently processing said digital signals based upon said comparison in step c) to initiate an I/O data transfer when said processing period is shorter than said I/O period; and g) continuing processing of said digital signals in accordance with said plurality of processes stored in said memory means.

5. Method according to claim 5 comprising the further step of passing addresses of said I/O means between said processes as input and output parameters in a process function call.

* * * * *

UNITED STATES PATENT AND TRADEMARK OFFICE
CERTIFICATE OF CORRECTION

PATENT NO. : 5,487,154
DATED : January 23, 1996
INVENTOR(S) : Keita GUNJI

It is certified that error appears in the above-indentified patent and that said Letters Patent is hereby corrected as shown below:

At column 6, line 28, delete "211" and insert --21,--.

At column 8, line 22, delete "for" and insert --or--.

At column 8, line 49, delete "5" and insert --4--.

Signed and Sealed this

Third Day of September, 1996

Attest:

BRUCE LEHMAN

Attesting Officer

Commissioner of Patents and Trademarks